Feb. 21, 1950  R. M. HAFF  2,498,417
REGISTERING AND PRINTING FRAME
Filed May 3, 1944  3 Sheets-Sheet 1

INVENTOR.
Richard M. Haff.
BY
ATTORNEYS

Feb. 21, 1950 R. M. HAFF 2,498,417
REGISTERING AND PRINTING FRAME
Filed May 3, 1944 3 Sheets-Sheet 2
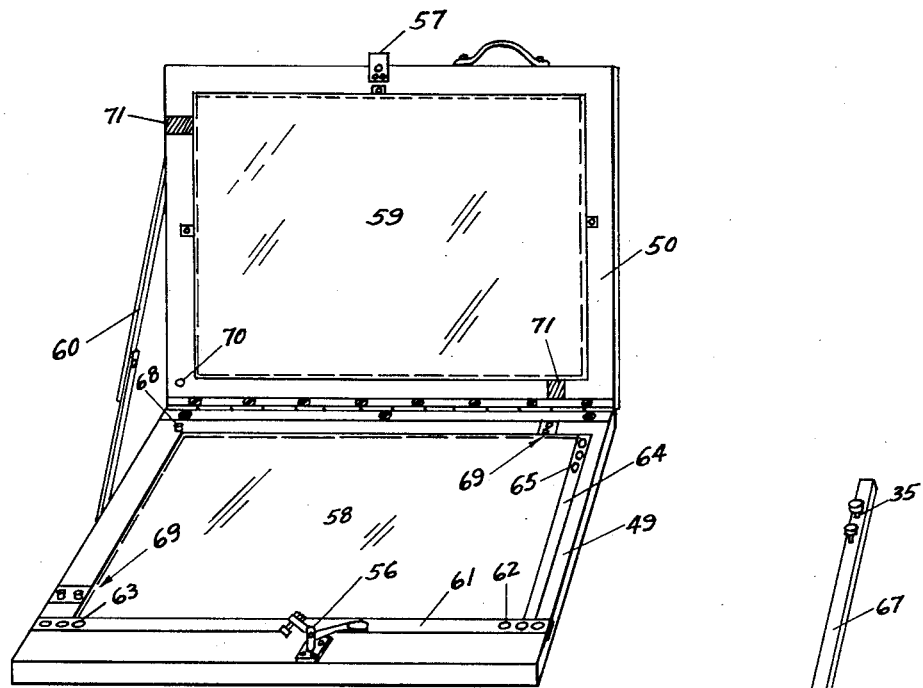
FIG.3.
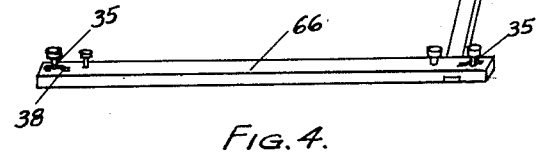
FIG.4.
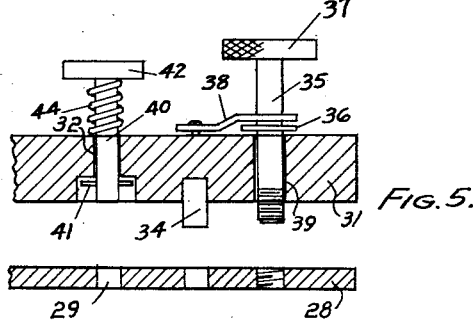
FIG.5.
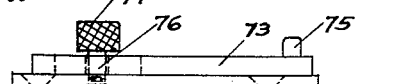
FIG.6.
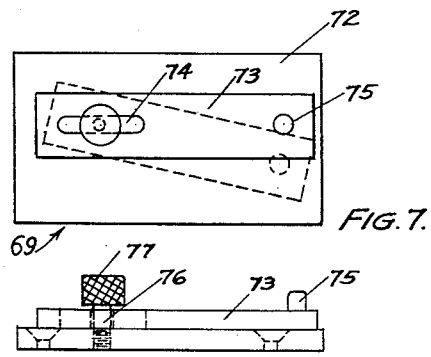
FIG.7.
FIG.8.
INVENTOR.
Richard M. Haff.
BY
ATTORNEYS.

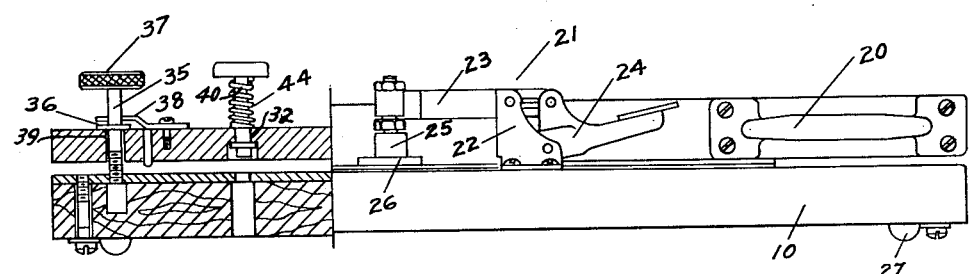

Patented Feb. 21, 1950

2,498,417

UNITED STATES PATENT OFFICE 2,498,417

REGISTERING AND PRINTING FRAME

Richard Mance Haff, Binghamton, N. Y., assignor to General Aniline & Film Corporation, New York, N. Y., a corporation of Delaware Application May 3, 1944, Serial No. 533,859

12 Claims. (Cl. 164—85)

This application pertains to a combination registering and photographic printing frame. The frame is especially adapted to be used in photographic laboratories or dark rooms for either amateur or professional use, and greatly facilitates making of color prints when more than one negative is employed for making a single print.

In making color prints, it is necessary, according to one accepted practice, to employ three or more separate negatives, each of these negatives being used independently in exposing the photographic paper or other material to light of one of the primary colors. For example, three negatives are made, one for red, one for green, and another for blue, these being produced from an original color transparency. Then each of these negatives is printed upon light sensitive paper or other photographic material provided with emulsion layers adapted to be developed out and to produce the primary colors and various shades and combinations thereof.

Since each of the negatives is printed independently, it is essential that each be registered with the other and with the photographic paper so that all three printed images will coincide precisely. For accomplishing this registration, the negatives are brought into exact registry by superimposing one upon another above a source of illumination and moving them about until the image of the upper negative exactly overlies that of the lower. While maintained in that position, both negatives are simultaneously punched. The same procedure is followed with the third negative, and when it has been punched, the three are laid aside temporarily while the paper is correspondingly punched or perforated, whereupon the frame is then used as a printing frame, it being especially adapted to printing color separation work of this sort and being especially provided with locating means which will engage the perforations formed by the punching means. In printing, the paper is placed in position with its perforations engaged by the locating means, and each of the negatives is independently located and then printed by using the particular color of light for which it is intended.

Several forms of the invention have been illustrated and are described herein. However, each of them follows the same basic concept although the details vary as required for different purposes. Briefly, the combined registering and printing frame includes a base in which a glass plate or window slightly larger than the picture to be printed is set and a cover hinged for opening and closing, this cover being provided with a similar window. The lower glass plate is for the purpose of transmitting light to the negatives as they are registered and punched. The glass plate in the cover is for admitting the differently colored light during printing. At one side of the glass plate and preferably forming a permanent part of the frame, is a die bar with which cooperates a removable punch mechanism including a guide bar and a plurality of punches, also means for locating it with respect to the die bar and for retaining it in position while it is being used. Preferably, the punch bar and its attached parts are to be quickly removable, since they need not be retained in position except while registering and punching the negatives.

At the opposite, or at another, side of the window in the frame, a locating bar is attached, this locating bar including a plurality of projections similar in shape and spacing to the perforations produced by the punch mechanism, but oppositely disposed.

Modification of certain details are described, but those modifications apply to a combined registering and printing frame adapted to function in substantially the manner above described. The details of the principal form of the invention and of the modifications will be set forth in the following paragraphs and by reference to the figures of drawing in which:

Fig. 3 is a perspective view of a modified form of the invention.

Fig. 4 is a perspective view of the punch bar and associated elements which are to cooperate with the modified frame of Fig. 3.

Fig. 5 is a detail sectional view of part of the punch bar mechanism.

Fig. 6 is a similar view of the die bar which cooperates with the punch bar.

Figs. 7 and 8 are a plan and side elevation, respectively, of locating means to be used with the modified frame of Fig. 3.

Fig. 9 is a partial section and front elevation of the frame of Figs. 1 and 2 showing certain details thereof.

Fig. 10 is a detail view of one of the punching means.

Fig. 11 is a section taken transversely through the punch stem, Fig. 10.

Fig. 12 is an end view of the punch of Fig. 10.

Fig. 13 is a detail view of one of the punch bar retaining screws.

Fig. 14 is a transverse section of a fragment of the printing frame showing one form of hinge adapted to be used for attaching the cover or lid to the base.

Figs. 15 and 16 are a plan and elevation, respectively, of a modified form of locating bar of adjustable type.

Fig. 17 is a section at line 17—17 through the bar shown in Figs. 15 and 16.

Fig. 18 is a plan view of the punch bar employed with the frame of Figs. 1 and 2.

Fig. 19 is an elevation of the punch bar shown in Fig. 18.

Figure 1:
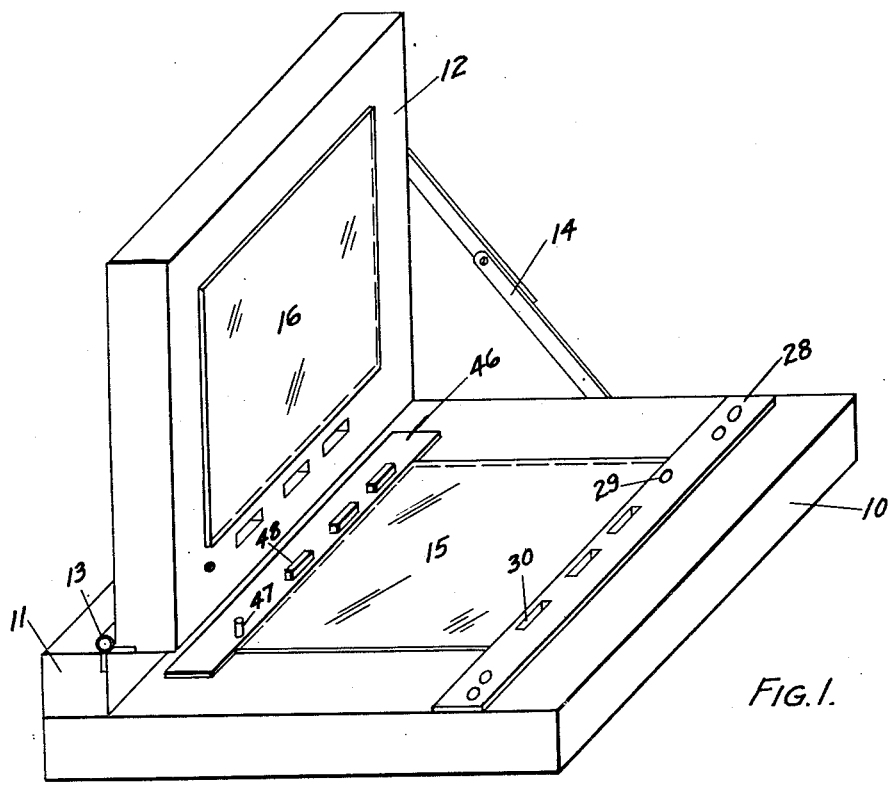
Fig. 1 is an isometric view of a registering and printing frame constructed in accordance with the invention.
Figure 2:
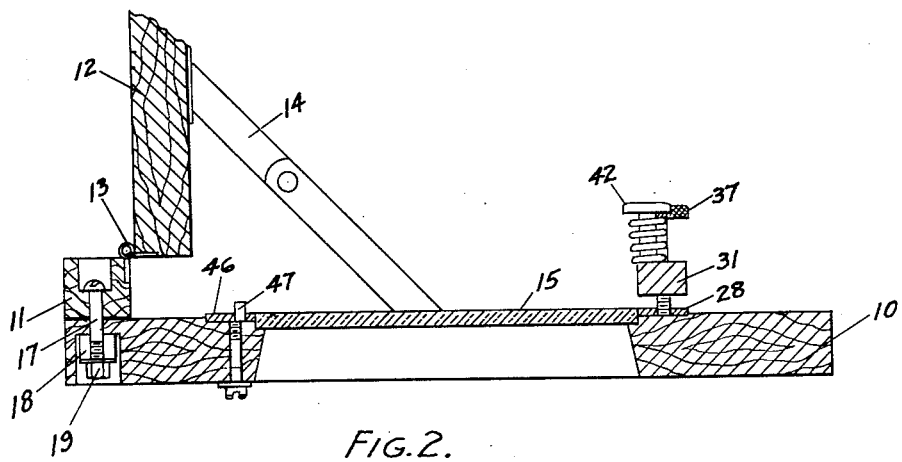
Fig. 2 is a transverse section through the printing frame of Fig. 1.

Now referring to Figs. 1 and 2, the combined registering and printing frame includes a rectangular base 10, a hinge bar 11, and a cover or lid 12. The cover may be swung to opened position about a hinge 13 and is adapted to be maintained in that position by the brace 14 which is preferably provided with a notch or catch for retaining it in the position shown in these figures. A glass plate or window 15 is set in the base 10 and is retained therein by any conventional means such as metal clips engageable within or over beveled edges of the plate. The surface of the glass plate is raised from the upper surface of the base. A similar plate 16 is set in the lower surface of the cover and is maintained in position by similar means. It is also so positioned as to have a surface projecting slightly beyond the parallel surface of the cover.

The hinge bar attaches to the base by a plurality of bolts 17 which extend through holes in the bar and corresponding holes at the back of the base. Leaf springs 18 are inset in cavities at the lower side of the base and are tensioned as the nuts 19 are drawn up on the bolts 17. These springs allow the hinge bar 11 to be raised away from the base, although when the cover is raised, it is tightly maintained in contact therewith. When the cover 12 is closed and latched in that position, springs 18 will deflect allowing the hinge bar to be lifted. Contact between the base and cover is then limited to the surfaces of windows 15 and 16.

In Fig. 9 further details are illustrated including a lifting handle 20 and a latch generally indicated by numeral 21 and which includes a bracket 22, a lever 23, handle 24, and an adjustable compression member 25 made of rubber or other suitable material. The compression member 25 engages a projection 26 extending forwardly at the lower edge of the cover and which serves to transmit the force of the catch 21 through to the cover whereby it will be resiliently held in position at the front as well as at the back of the frame. Rubber pads or buttons 27 of conventional type act as cushions or supporting means for the frame.

A die bar 28 is permanently attached to the base 10, preferably being located at the front thereof, although it is possible to locate it otherwise, but probably not as convenient. This die bar is preferably formed of strip steel and is connected to the frame by means of suitable screws, either of a type to be inserted from the bottom of the frame and to be threaded into the bar itself, or alternately, wood screws such as might be inserted through countersunk holes in the bar and screwed into the wood or other material of the frame. The bar has at one end a circular die opening 29 and in alignment therewith and extending along the length of the bar at more or less equally spaced intervals, a plurality of rectangular die openings 30. There may be any convenient number of these openings, depending upon the size of the frame and at what spacing it is desired to perforate the edges of the paper and registered negatives. The end or terminal openings should be so positioned as to be slightly within the outer edges of the glass window, and so positioned that they may be used to perforate the paper and negatives at substantially the corner thereof. Of course, if paper and negatives smaller than the maximum to be accommodated by the frame are printed, then the circular opening 29 is used for perforating the corner, and as many of the other openings 30 or dies cooperating therewith are employed as are needed for that particular size of paper.

Now referring to Figs. 2, 9, 18 and 19, a punch bar 31 of similar plan form to the die bar is provided with a plurality of punch openings or guides corresponding to the number and spacing of the cooperating openings in the die bar. These guides for the punches include one circular guide opening 32 and a plurality of squared guide openings 33, Figs. 18 and 19. The bar is also provided with dowel pins 34 which engage the second openings or holes adjacent to ends of the bar 28. These dowel pins position the punch bar on the die bar, and thus allow it to be removed and replaced with assurance that the punches will align with their respective dies. At each end of the bar, means is provided for clamping the punch mechanism in position over the die bar, said means including an attaching screw 35 having a collar 36 and a knurled head 37. The collar 36 engages beneath a clip 38 and the screw is thus retained within the opening or hole 39 at the end of the bar and in position to align with a tapped hole adjacent the end of bar 28. Of course, a similar construction is employed at each end of the bars 31 and 28, see also Figs. 5 and 6.

Each of the punches includes a stem 40, a collar 41, a head 42, and a punch 43. For the end guide 32, the stem 40 will be of circular cross-section. For the others, as at 33, the stem is squared and adapted to fit the squared openings above mentioned. The end punch is also of circular shape and adapted to fit the die opening 29, Fig. 1, while the others are rectangular and so ground as to fit the openings 30. Each of the punch elements is provided with a spring 44 which serves to retain it in uppermost position wherein the collar 41, fixed to stem 40, engages against the bottom of the counterbore 45. In that position the operating or perforating part of the punch does not project beyond the lower surface of the bar. Both the circular and rectangular punches 43 are ground with a taper as shown in Fig. 10 so as to give a cleaner perforation, since the shearing action takes place in a progressive fashion.

A locating bar 46 is made of strip material similar to that of the bar 28, and is connected or attached to the base in a similar manner. This locating bar is preferably disposed adjacent the rear edge of the window 15 although it may be positioned at the side of the frame if a square window were to be used or if the bar 28 were positioned at the side rather than at the front. The locating bar is provided with a plurality of projections, one of which is circular and the remainder of which, according to one form which the construction may take, are rectangular. However, all may be circular.

When the perforated paper and negatives are removed from the position which they occupy when being punched and are transferred to the locating bar, they are reversed as to their position, that is, are swung throughout 180 degrees. Then the perforation made by the end die cooperating with opening 29 must engage a projection 47 at the diagonally opposite position with respect to window 15. Then the other projections are spaced from the pin 47 according to the spacing of the perforations formed by the dies employed in conjunction with the bar 28.

Negatives have a tendency to shrink slightly, and provision must be made for that shrinkage, since negatives may be printed many times and at widely separated intervals. For that purpose, the spacing and shape of the pins 48 is such that perforations in the negatives will still engage them even though some shrinkage has taken place. That is accomplished by making the rectangular pins 48 shorter than the openings or perforations they are to engage, or alternatively by employing circular pins for engaging the elongated openings. Of course the position of the pins is such that they do not contact the perforations except at the sides of those elongated openings. In other words, provision is made for the perforations to slide or change their position relatively along the length of the bar 46 without engaging their ends with those pins upon which they are held. The cover is provided with holes for the reception of the pins 47 and 48 when it is clamped in closed position.

Now referring to Figs. 3, 4, 5, 6, 7 and 8, a modification will be described in which the general principles of construction are similar to those pertaining to the frame of Figs. 1 and 2. This modified form of frame provides for perforating paper and negatives at three corners and for locating them in a similar way. It is not necessary to punch elongated holes, and yet the mechanism is adapted to provide for shrinkage. The printing frame of Figs. 1 and 2 is adapted to take care of a wide range of negative and printing material sizes. That of Figs. 3 and 4, while not limited to paper and negatives of a particular size, is probably more adapted to one size of paper and negatives than the form first disclosed.

In Fig. 3 the registering and printing frame includes a base 49 and a cover 50. The cover may be hinged in the same manner as described and shown with respect to the first form of the invention, but according to the particular form illustrated a simpler construction is used, that being illustrated in detail in Fig. 14. No hinge bar is necessary, and the hinge 51 is directly attached to the cover 50 at one side and to the back edge of the base 49. To provide for resiliently pressing the glass windows into contact with the negative and printing material, the lower hinge member is resiliently retained in position by a plurality of screws 52 which extend into appropriate holes in the framework, the lower part of which are greatly enlarged or counterbored. A spring 53 is compressed against a washer 54 by a nut 55. A clamp 56 at the front of the base engages a projection 57 on the cover and resiliently locks it in closed position, all as described with respect to the first form of the invention, especially with reference to Fig. 9.

A window 58 in the base and a second window 59 in the cover are similar to the windows 15 and 16 and are inserted and retained in any convenient manner. The cover is maintained in opened position by a brace 60, hinged at the base, at the cover, and also at its mid-point.

Since the paper and negatives handled in this combined registering and printing frame are to be punched and held at three corners, or at points substantially adjacent those corners, there must be die bars and punch guiding bars for cooperating with them at two sides of the base. At the front a bar or strip 61 is inset or otherwise attached in any convenient manner so that its top surface will be flush with the surface of window 58. That bar has circular die openings 62 and 63. At the side, die bar 64 is provided with a similar die opening 65.

The punch guiding or carrying bars illustrated in Fig. 4 include a front bar 66 and a side bar 67. These bars are not necessarily to be connected and employed as a unit, although it is more preferable that they be handled or operated in that way. At each end the retaining or clamping means includes an attaching screw 35, retained by a clip 38, as illustrated and described in Figs. 6, 9 and 13. Dowel pins 34 are also positioned adjacent the clamping or retaining screws and serve the same purpose as the dowel pin described with respect to the punch bar 31.

While more punches than have been illustrated may be employed, it is sufficient to use one circular punch at each of the three corners, or adjacent thereto, and those punches may be of a type previously described and illustrated in Fig. 10, except that the stem need not be squared, nor need the punch itself be of special shape. Both are circular in cross-section and thus the simplicity of this device renders it more easily machined and assembled and lowers its cost. The same advantages apply to the production of the die bars 61 and 64. They require only drilled and reamed holes or tapped holes.

Since the paper and negatives are punched with circular openings which must engage the locating means without any appreciable clearance, it is evident that shrinkage of the negative, or any slight misalignment of the openings, would make it virtually impossible to register the paper and negatives for printing if fixed locating pins are used. To compensate for misalignment or shrinkage and to make it unnecessary for the punches to be positioned with extreme accuracy, one fixed locating pin and two adjustable pins are employed. The pin 68 is fixedly positioned at the corner of the base, and that pin engages the hole punched at the diagonally opposite corner, and by the punch cooperating with die opening 62. Adjustable positioning pins are attached to the base, these being generally indicated by the numeral 69, Fig. 3, and illustrated in detail in Figs. 7 and 8. The locating pins and their cooperating elements project above the surface of the base and a hole 70 and channels 71 in the cover provide clearance for closing the cover.

Now referring to Figs. 7 and 8, an adjustable positioning means includes an attaching plate 72 connectible to the base by means of wood screws or any other suitable means for that purpose. A short bar 73 is slotted as at 74 and carries a pin 75 similar to the pin 68 and of a size for fitting the punched holes as above described. A clamping screw 76 has a knurled head 77 and serves to retain or clamp bar 73 in any adjusted position. The bar 73 may be swung to either side or may be moved longitudinally so that by loosening the clamping screws any desired adjustment may be made, and accordingly, the locating pins 68 and 75 set so as to accommodate the paper and negatives punched at the opposite side of the frame, even though a certain amount of shrinkage may have taken place.

Now referring to Fig. 15, a modified form of locating bar is shown. This bar is adapted to replace the bar 46, Figs. 1 and 2. It differs in that one locating pin is fixed while the remainder of them are adjustable lengthwise of the bar and accordingly may be moved to register with openings punched in the paper and negatives so long as those openings are of the same size as the pins. This bar may be used for negatives which have suffered considerable shrinkage, or may be employed for negatives punched on an entirely different frame and in which the spacing of the punches might vary widely, so long as the diameter of the holes produced is of a size to fit the pins.

The bar includes a strip 78 which is machined in such a manner as to form one side of a dovetailed slot, the opposite side of which is provided by a clamping or retaining strip 79. A pin 80 is fixedly positioned at one end of the strip 78, while a second pin 81, set in a block 82, may be moved along the length of the bar or may be clamped in any position along the dovetailed slot. The block 82 is tapered to fit the dovetailed slot and to be clamped as the clamping screws 83 are tightened down. There may be as many of these blocks 82 and pins 81 as are desired. Depending upon the length of the strip 79, more than two clamping screws 83 may be employed if necessary.

The materials from which the printing frame may be made include any appropriate kinds of wood, ply wood, or combinations of wood and metal or plastic materials. The fittings, such as the hinges, braces, springs and clamp, may be purchased from those available on the market. The windows are preferably of plate glass and may or may not be frosted or otherwise rendered light diffusing. They should be suitably beveled at those edges which project above the surface of the wood or other material into which they are set.

While the adjustable locating pins have been described by reference to the frame shown in Fig. 3, it is to be understood that they may be employed in place of the locating means of Fig. 1. Several of the adjustable pins may be arranged in alignment at the back of the frame and take the place of the fixedly positioned, squared pins 48. In this event, it would not be necessary to employ strip 46.

Instead of rectangular punches and die openings, elongated perforations may be formed by dies similar to the rectangular dies except that the ends may be rounded rather than angular. Such construction allows the die openings to be formed by drilling and milling.

Instead of providing a punch for each of the die openings, a modification contemplates a single punch which may be transferred from one guide opening in the punch bars to the other openings. Thus, a single punch may serve instead of the plurality of punches shown and described with respect to Figs. 1 and 3. In that event, it is not necessary to provide the punch itself with a collar nor is it necessary to employ the springs 44.

In describing the mode of use of the combined registering and printing frame, it is assumed that the color separation negatives have already been made. These negatives are registered and punched or perforated by first opening the cover of the frame and placing the punch bar and attached or cooperating punching means in place. The dowel pins serve to locate the bar in proper relationship to the die bar and the assembly is completed by screwing down on the retaining or clamping screws although it is not desirable to tighten them down to the fullest extent until the time when the perforations are to be punched. The clips 38 maintain the bar in raised position until the clamping screws are turned down for the expressed purpose of lowering and pressing the bar into position.

The first negative is placed over the window in the base of the frame and it is assumed that a light is provided beneath the window by means of which the details in the negative may be clearly seen. This negative is temporarily held in position with one edge overlying the die openings in the die bar so that the perforations eventually to be formed may be located outside the picture area, but not too close to the margin of the negative material. It may be held to the glass window by adhesive tape. The second negative is then placed over the first and is moved to such a position that both images coincide. A magnifying lens may assist in registering, especially if the image is comprised of relatively close or fine details. The second negative is taped in position, whereupon the die bar is clamped down and the perforations punched.

The second negative is removed and the third negative is registered and punched, whereupon the three negatives are laid aside while the sensitized paper is punched, after which the punch bar and cooperating elements may be removed. The paper is then placed in printing position, being positioned by the various pins on the locating means. Of course, the registering light should be turned off after the negatives have been punched and before the sensitized paper is removed from its container. When the first negative to be printed is placed above the paper and in position on the pins the cover is closed, clamped, and the printing light turned on. That negative is printed, of course, by using that particular color of light for which it is intended. Then each of the other negatives is printed with its own color of light, whereupon the sensitized paper may be subjected to developing and other processes essential to the development of and fixing of a colored image thereon. Of course, as the process for color printing or other printing varies, the manner of using this combined registering and printing frame may be varied. It is intended to be employed for all types of printing materials and for the printing of any subject matter for which it may be found useful.

While the invention has been described by reference to specific embodiments of the same, it is evident that the inventive concept may be carried out in other ways. The disclosure is to be interpreted broadly and is intended to include all variations which may occur to those skilled in the art, but which fall within the spirit of the invention and scope of the appended claims in which my invention is defined.

I claim:

1. A photographic printing frame including in combination a base and a cover, a window in the base and another window in the cover, punching means and locating means for paper and negatives to be printed, said punching means including a die bar and a punch carrying bar, a plurality of punches guided within the punch bar and registering with cooperating holes in the die bar, one of said punches being circular and the other being rectangular in shape, the locating means comprising a bar at the opposite side of the base and having a plurality of projecting pins for engaging the perforations in the paper and negatives, said pins corresponding in spacing and in shape to the spacing and shape of the perforations made by the punches in the die.

2. A photographic printing frame having in combination a base and cover, a window in the base and another window in the cover, said cover being hinged for swinging away from the base and having a brace for maintaining it in opened position, means for punching paper and negatives to be printed and other means for locating and retaining the paper and negatives in position to be printed, said locating means including a bar and projecting pins, the bar being positioned adjacent to the window in the base, and the cover having spaced openings registering with the pins in the locating bar.

3. A photographic printing frame having in combination a base and cover, a window in the base an another window in the cover, punching means and locating means for paper and negatives to be printed, said punching and locating means being positioned adjacent to the window in the base and at opposite sides thereof, said cover being hinged to the base and being so constructed that when closed, paper and negatives being printed will be maintained in flattened condition between the windows, said punching means comprising a die bar substantially flush with the surface of the window in the base and a detachable punch carrying bar moveable to and from an active position with respect to the die bar so that the cover may be closed without interference with the punch or with the said die bar.

4. Punching means for perforating registered photographic negatives which includes in combination a die bar having die openings therein, a plurality of punches for cooperating with said die openings and a bar in which said punches are operatively maintained, means for attaching said punch carrying bar to said die bar so that the punches shall align with the die openings and so that the bars shall be readily attached and detached which includes positioning dowel pins in one bar and cooperating dowel receiving holes in the other and threaded connecting means at either end of the punch bar engageable within cooperating and complementary threaded means in the die bar, said punches further being so formed that one punch adjacent the end of the bar is circular in cross-section while others of the punches spaced therefrom are rectangular in cross-section, said rectangular punches having their longer dimension extending lengthwise of the punch and die bars, the remaining die openings in the die bar being rectangular in form.

5. In combination, a printing and registering frame, a means for perforating paper and negatives and a locating bar, said means for perforating paper and negatives including a die bar and at least two punching means, one of which is adapted to make a circularly formed perforation in the paper and negatives and the other of which is so constructed as to form an elongated opening with its longest dimension lengthwise of the die bar, said locating bar having a plurality of pins spaced on centers corresponding to the spacing of the punching means, one said pin being circular and of the same size as the circular punch, while the other pin for engaging the elongated perforation is of the same width as that perforation, but of a lesser dimension lengthwise thereof.

6. In combination, a printing and registering frame, having a base and a cover, a window in the base and another window in the cover, means for perforating paper and negatives to be printed including die bars at two sides of the window in said base, at least one die opening adjacent each of three corners of the said window in the base, perforating means including at least one punch and guiding means therefor cooperating with said die bars, locating means for punching the perforated paper and negatives, said locating means including pins for engaging said perforations, at least one of said pins being adjustably disposed with respect to others thereof.

7. An adjustable locating means for a combined printing and registering frame including a bar carrying a pin and bar slotted for movement relative to a supporting element, and a clamping screw for retaining said bar and pin in any adjusted position.

8. A locating means for positioning paper and negatives to be printed in a combined printing and registering frame including a length of strip material and at least two locating pins projecting from one surface of said strip material, at least one of said pins being slidable along the length of said strip material, and clamping means for retaining it in an adjusted position.

9. A photographic printing and registration frame including in combination a base and a cover hinged to said base, a window in the base and a window in the cover, punching means including a die bar and a punch bar, said die bar having a plurality of die openings therein and being fixed in position in the said base and adjacent the window therein, said punch bar comprising a bar and means for attaching and detaching it to the die bar, a plurality of punch guiding openings in said bar in alignment with the die opening in the die bar when the punch bar is in operative position with respect to the said die bar, and at least one punch operatively retainable within said punch guiding openings, and means forming an integrally operative part of said frame for maintaining registered and perforated negatives in position for printing which comprises a bar fixed at the opposite side of the window from the die bar and a plurality of projections extending from the surface of said bar and being spaced and corresponding in size to the openings in the die bar, but being reversely disposed with respect thereto.

10. A photographic printing and registration frame including in combination a base and a cover hinged to said base, a window in the base and a window in the cover, punching means including a die bar and a punch bar, said die bar having a plurality of die openings therein and being fixed in position in the said base and adjacent the window therein, said punch bar comprising a bar and means for attaching and detaching it to the die bar, a plurality of punch guiding openings in said bar in alignment with the die openings in the die bar when the punch bar is in operative position with respect to the said die bar, and a plurality of punches operatively retained within said punch guiding openings, and means forming an integrally operative part of said frame for maintaining registered and perforated negatives in position for printing which comprises a bar fixed at the opposite side of the window from the die bar and a plurality of projections extending from the surface of said bar and being spaced and corresponding in size to the openings in the die bar, but being reversely disposed with respect thereto, and means in said cover to permit closing the cover without interference with the said projections, and other means for holding said cover in raised position and for clamping it in closed position.

11. A photographic printing and registration frame including in combination a base and a cover hinged to said base, a window in the base and a window in the cover, said windows being inset in such manner as to project slightly beyond the sufaces of the respective elements within which they are retained, punching means including a die bar and a punch bar, said die bar having a plurality of die openings therein and being fixed in position in the said base and adjacent one edge of the window therein, said punch bar comprising a bar and means for attaching and detaching it to the die bar, said means also being movable to a position for retaining said punch bar slightly elevated from the die bar to provide a space within which a negative to be perforated may be inserted, a plurality of punch guide openings in said bar in alignment with and corresponding in number with the die openings in the die bar when the punch bar is in operative position with respect thereto, punches in said punch bar operatively retained by said punch guiding openings and resilient means for urging said punches in a direction to be retracted from the die bar, and means forming an integrally operative part of said frame for maintaining registered and perforated negatives for printing which comprises a bar fixed at the opposite side of the window from the die bar and a plurality of projections extending from the surface of said bar, said projections being spaced and corresponding in size to the openings in the die bar but being reversely disposed with respect thereto, means for retaining the hinged cover in raised position, means for clamping it in closed position, and a plurality of openings in said cover registering with the projections from the locating bar for permitting the cover to be closed without interference.

12. A photographic printing and registration frame including in combination a base and a cover hinged to said base, a window in the base and a window in the cover, said windows being inset in such manner as to project slightly beyond the surfaces of the respective elements within which they are retained, the said cover being hinged to the base by a hinge permitting swinging to and from open position and further having a spring means for urging the cover, when in closed position, toward the base so that the adjacent window faces will contact evenly throughout their entire extents, punching means including a die bar and a punch bar, said die bar having a plurality of die openings therein and being fixed in position in the said base and adjacent the window therein, said punch bar comprising a bar and means for attaching and detaching it to the die bar, a plurality of punch guiding openings in said bar in alignment with the die opening in the die bar when the punch bar is in operative position with respect to the said die bar, and at least one punch operatively retainable within said punch guiding openings, and means forming an integrally operative part of said frame for maintaining registered and perforated negatives in position for printing which comprises a bar fixed at the opposite side of the window from the die bar and a plurality of projections extending from the surface of said bar and being spaced and corresponding in size to the openings in the die bar, but being reversely disposed with respect thereto.

RICHARD MANCE HAFF.

REFERENCES CITED

The following references are of record in the file of this patent:

UNITED STATES PATENTS

| Number | Name | Date |
|---|---|---|
| Re. 14,517 | Ogden | Sept. 3, 1918 |
| Re. 20,855 | Fankboner | Sept. 13, 1938 |
| 581,831 | Perkins | May 4, 1897 |
| 799,401 | Petrie | Sept. 12, 1905 |
| 884,804 | DuPerrex | Apr. 14, 1908 |
| 1,023,828 | Faulk | Apr. 24, 1912 |
| 1,090,090 | Wolf | Mar. 10, 1914 |
| 1,159,955 | Kittredge | Nov. 9, 1915 |
| 1,377,511 | Novotny | May 10, 1921 |
| 1,509,806 | Fournier | Sept. 23, 1924 |
| 1,620,343 | Hacker | Mar. 8, 1927 |
| 1,820,880 | Crehore | Aug. 25, 1931 |
| 1,981,932 | Welk | Nov. 27, 1934 |
| 1,987,395 | English | Jan. 8, 1935 |
| 2,011,584 | Lengel | Aug. 20, 1935 |
| 2,035,777 | Welk | Mar. 31, 1936 |
| 2,151,429 | Klopp | Mar. 21, 1939 |
| 2,198,169 | Kallusch | Apr. 23, 1940 |